United States Patent [19]
Finch et al.

[11] Patent Number: 5,203,022
[45] Date of Patent: Apr. 13, 1993

[54] CLAMPING ASSEMBLY FOR INTERLOCKING A RADIO AND BATTERY HOUSING

[75] Inventors: Steven J. Finch, Sunrise; Faris S. Habbaba, Boca Raton; Jeffrey P. Marchuk, Ft. Lauderdale; Steven M. Joss, Sunrise, all of Fla.

[73] Assignee: Motorola, Inc., Schaumburg, Ill.

[21] Appl. No.: 665,204

[22] Filed: Mar. 5, 1991

[51] Int. Cl.⁵ ............................................. H04B 1/03
[52] U.S. Cl. ............................. 455/127; 455/348; 455/349; 361/391; 361/393; 361/422; 361/427; 403/309; 429/97; 429/98; 429/100
[58] Field of Search ............... 361/391, 393, 394, 396, 361/422, 427; 429/96, 97, 98, 99, 100; 455/90, 127, 128, 344, 347, 348, 349; 403/309, 313

[56] References Cited

U.S. PATENT DOCUMENTS

| | | |
|---|---|---|
| 3,668,528 | 6/1972 | Hutchinson et al. |
| 3,736,591 | 5/1973 | Rennels et al. |
| 4,532,194 | 7/1985 | Liautaud et al. ............... 429/99 |
| 4,578,628 | 3/1986 | Siwiak |
| 4,681,476 | 7/1987 | Mischenko |
| 4,746,242 | 5/1988 | Mischenko |
| 4,933,988 | 6/1990 | Thibault ............... 455/349 |
| 4,972,508 | 11/1990 | King ............... 455/90 |
| 5,109,540 | 4/1992 | Dzung et al. ............... 455/348 |

FOREIGN PATENT DOCUMENTS 2818702 11/1979 Fed. Rep. of Germany ...... 403/309

*Primary Examiner*—Reinhard J. Eisenzopf
*Assistant Examiner*—Timothy H. Keough
*Attorney, Agent, or Firm*—Juliana Agon

[57] ABSTRACT

A portable radio assembly comprises a radio housing (12), a battery housing (14), and a sliding clamp (40) for interconnecting the housings (12 and 14).

18 Claims, 3 Drawing Sheets

CLAMPING ASSEMBLY FOR INTERLOCKING A RADIO AND BATTERY HOUSING

TECHNICAL FIELD

This invention relates generally to the connection between a battery pack and an electronic equipment that the battery pack will energize.

BACKGROUND

Battery packs are intended for attachment to and for the energizing of electrical or electronic equipment such as two-way portable radios or transceivers, or other portable communication devices. For safety purposes it is desired to ensure that the battery housing containing the battery pack is fully attached and locked into the proper position with the housing containing the radio before radio operation.

To detachably interconnect the radio housing to the battery housing, the prior art interconnection method utilizes the integral structures of both housings alone. For example, a forward section or a protrusion was formed on the bottom portion of a radio housing. The protrusion was then slipped into an opening formed by an inturned edge positioned around three top side edges of the battery housing. As the radio housing is pushed or slid forward, in a horizontal direction, onto the battery housing, a flange formed on the bottom of the forward section or protrusion of the radio housing is captivated under the underside of the battery housing ledge. The forward section or protrusion and the bottom flange of the radio housing thus formed an internal base plate that slid onto a receiving battery housing. For extra strength, the internal base plate of the radio housing is made of metal. However, because of space consideration, and the interconnect design of the prior art, the rails which integrally form the ledge on top and around the battery housing were molded out of plastic, which intrinsically is not as strong as metal.

It is known that two-way portable radios and their battery packs or housings are often used in rugged environments where the radio may be dropped or torqued, or function in a chemically severe or other harsh environments. In such a severe environment, the plastic rails of the prior art design may degrade and not provide a sufficiently reliable battery and radio interconnect. Therefore, it is desired that a battery radio interconnect assembly be capable of providing rigid support and strength even in ruggedized applications such as severe environment and/or mechanical shock while providing an easy removal of the battery from the radio, a reliable hermetic seal, and sufficient feedback to ensure that the radio and battery housings are safely locked or unlocked.

SUMMARY OF THE INVENTION

Accordingly, it is an advantage of the present invention to provide an external base plate or clamp that slides to increase significantly the strength of the battery/radio interface by providing metal and well-supported plastic instead of thin plastic rails. In addition, a positive locking feature is provided by combining three springs in a single wrap around design between one of the housings and the external sliding base plate or clamp to provide strength and feedback.

Briefly, according to the invention, a portable radio assembly comprises a radio housing, a battery housing, and a sliding clamp for interconnecting the housings.

Accordingly to another aspect of the invention a sliding spring-loaded lock assembly includes two housings, a clip, and a slide. The first housing has a first pair of opposed dovetail grooves. Similarly, the second housing has a second pair of opposed dovetail grooves. The clip is substantially U-shape and has first and second elongated substantially parallel arms and an intermediate portion connecting the arms. The arms include two pairs of opposed cantilever beams while the connecting portion includes a leaf spring. Correspondingly, the slide is also substantially U-shape and has first and second elongated substantially parallel arms and an intermediate portion connecting the arms. The arms have two paris of opposed dovetail rails for engaging both pairs of dovetail grooves of the housings and a pair of opposed recesses for receiving the pair of cantilever beams to lock the slide against the clip. The connecting portion has a backside for spring loading the leaf spring.

Accordingly to a further aspect of the invention, a battery comprises a battery power source and a battery housing enclosing the power source. Additionally, the battery housing includes side rails.

DETAILED DESCRIPTION OF THE PREFERRED EMBODIMENT

Figure 1:
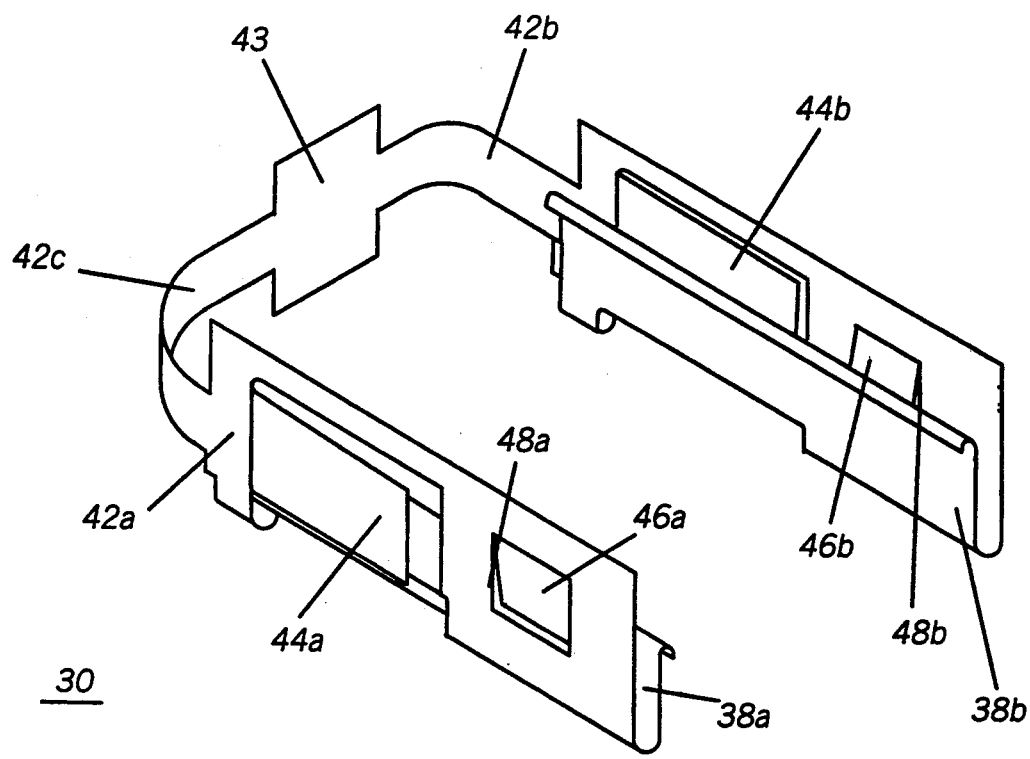
FIG. 1 is a perspective view of a clip 30 in accordance with the present invention.
Figure 2:
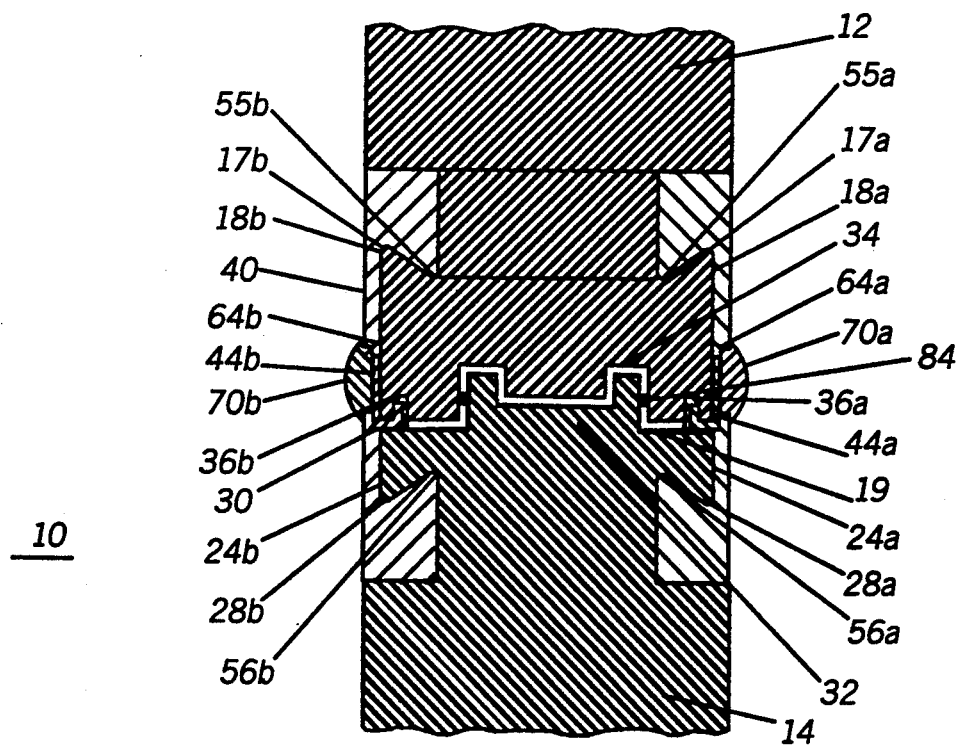
FIG. 2 is a cross-sectional view of a radio 10 of FIG. 3 with a clamp 40 attached and fully closed in accordance with the present invention.
Figure 3:
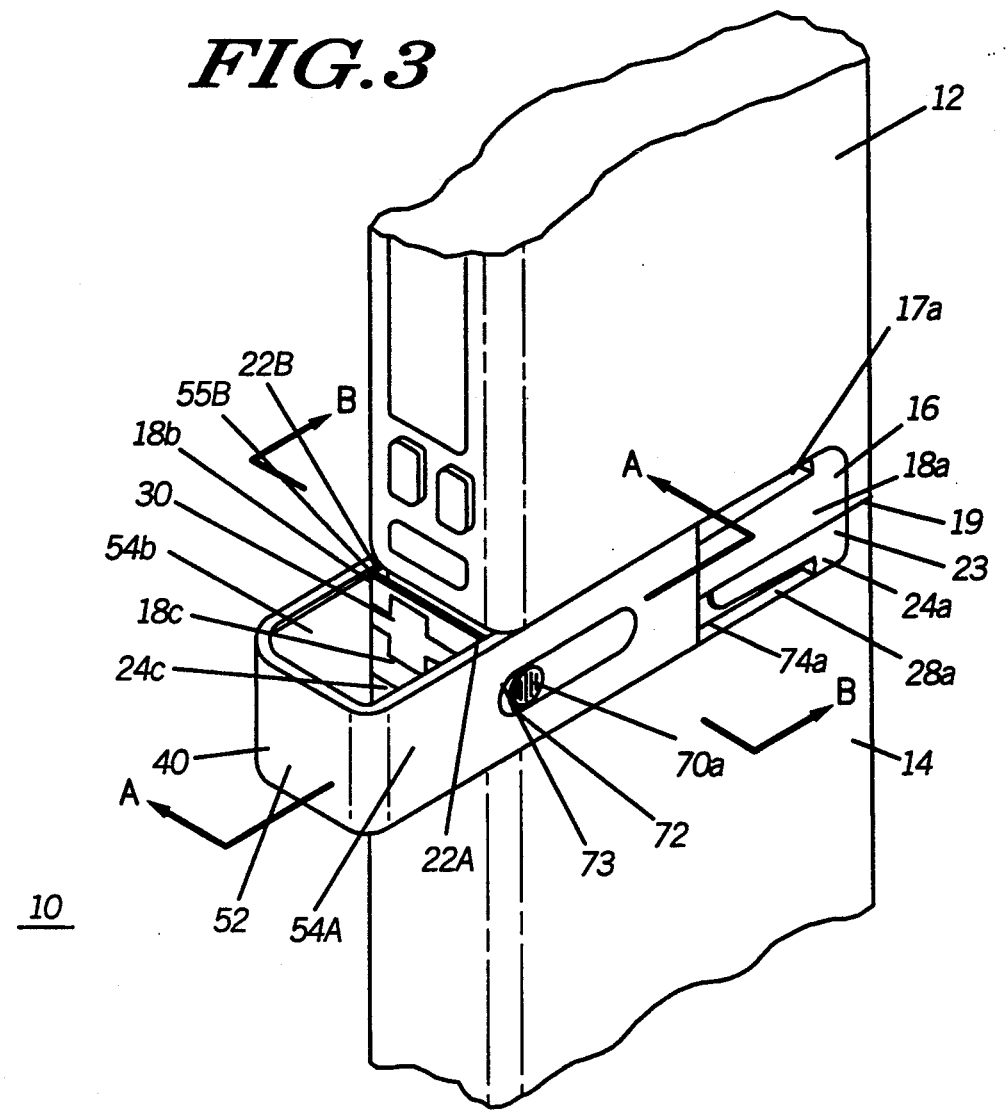
FIG. 3 is a perspective view of the radio 10 including the clip 30 of FIG. 1 attached, and a clamp 40 of FIG. 4 attached but not fully closed.

Referring to FIGS. 3 and 2, a battery powered portable device is provided. In FIG. 3, a perspective view of a radio 10 including two housings 12 and 14, a clip 30 of FIG. 1 attached to one of the housings 12, and a clamp 40 of FIG. 4 attached over both housings 12 and 14 in an unlocked position is illustrated. A cross-sectional view taken along lines B—B in FIG. 3 of the radio 10 with the clamp 40 attached and fully closed or rigidly interconnected is shown in FIG. 2. In this case, the portable device is the two-way portable radio transceiver 10 having a radio housing 12 which contains the operating electrical/electronic circuitry and associated components (not shown). Such circuitry is energized by a suitable power source when interconnected to supply terminals in a battery housing 14 which includes the battery power source.

Basically, according to the invention, the clamp 40 slides over both housings and latches onto the clip 30 attached to one of the housings to form a rigid radio/battery interconnection. To make room for the clamp 40, the radio housing 12 has a U-shaped recess 16 having elongated recessed arms 18a and 18b and a connecting recessed side portion 18c, surrounding substantially three sides of a bottom portion or a radio/battery interface 19 of the radio housing 12. Within and near the top of the U-shaped recess 16, there is a pair of dovetailed channels 17a and 17b having an opposed pair of initial entry points simultaneously at the intersections 22a and 22b between the recessed connecting side portion 18c and the recessed arms 18a and 18b.

Figure 6:
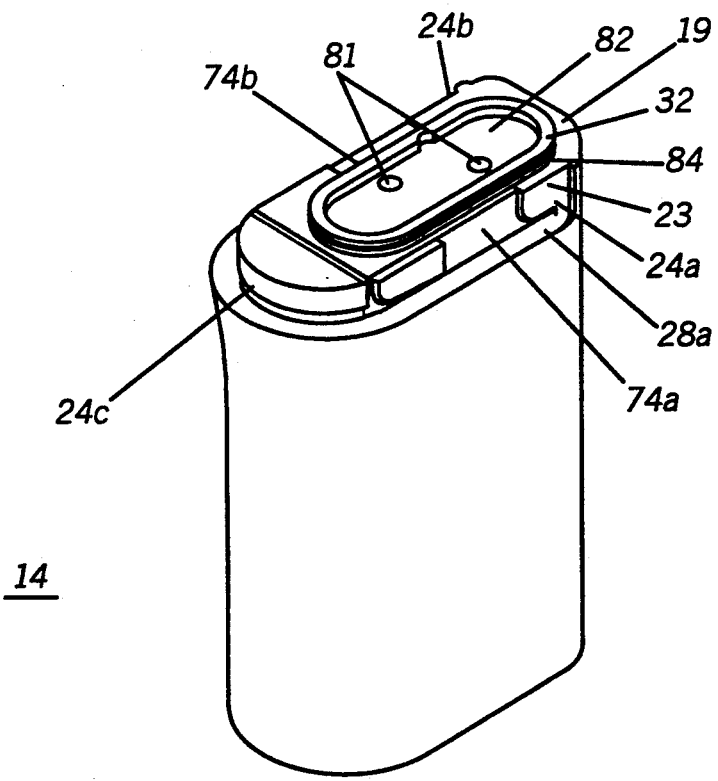
FIG. 6 is a more detailed perspective view of the battery housing 14 of FIG. 3.

Referring to FIG. 3 and FIG. 6, the battery housing 14 is shown. At the top of three sides of the battery housing 14, at the battery/radio or radio/battery interface 19, there is also a U-shaped recess 23 having elongated recessed arms 24a and 24b and a connecting recessed side portion 24c. The U-shape recess 23 also includes a pair of dovetailed channels 28a and 28b on the lower portion of each arms 24a and 24b. The dovetailed channels 28a and 28b of the battery housing 14 are interrupted by intermediate recesses or notches 74*1–b* to allow the vertical removal of the battery housing 14 from the radio housing 12 and from the sliding clamp or slide 40.

Referring to FIGS. 2, 3, and 6, the sliding and mounting arrangement is shown. Optionally, at least a single one, or both pairs of the dovetailed channels 17*a–b* and 28*a–b*, along the length, preferably taper away both from their entry points and the radio/battery interface 19 to form ramps. In other words, preferably, the pair of radio dovetailed channels 17*a–b* are tapered away from the battery tapered dovetailed channels 28*a–b*. The bottom of the radio housing 12 also includes a pair of slots 36a and 36b or other suitable attaching means on each wider sides 18*a–b* to enable the clip 30 (refer to FIG. 1) having a pair of corresponding fastening lips 38a and 38b to be attached or clipped.

For interconnection, a projection 32 extending from the top of the battery housing 14, above the U shape recess 23, is received by a corresponding hollowed-out portion 34 within the bottom of the radio housing 12. Battery contacts or terminals 81 are located in a recessed cavity 82 of this portion 34 for electrical interconnection of the battery and radio. The projection 32 and the corresponding hollowed-out portion 34 and are used to enable a vertical mounting of the radio housing 12 to the battery housing 14. It is to be appreciated that the projection 32 shown on the battery housing 14 can instead be formed on the radio housing 12. Vice a versa, the hollowed-out portion 34 shown here on the radio housing 12 can be formed on the battery housing 14. The U-shaped recesses 16 and 23 together form a larger U-shape recess when the housings 12 and 14 are vertically mounted together to make room for the clamp or slide 40 to slide over the two housings 12 and 14.

In addition, the projection 32 on the battery housing 14 also includes a recessed rim for receiving an O-ring 84. The O-ring 84 surrounding the battery contacts protected within the recessed cavity of the battery projection 32 thus forms a reliable hermetic seal when vertically mounted with the corresponding portions of the radio housing 12.

Referring to FIG. 1, a three directional spring-loaded clip 30 according to the present invention is shown disassembled from the radio housing 12. The spring-loaded clip 30 is formed of a flat sheet of metal which has been formed in the shape of a U, having elongated arms 42a and 42b and a connecting side portion 42c. The U-shape wrap-around sheet metal strip 30 preferably clips onto the radio housing 12. However, a suitable strip may also clip onto the battery housing instead.

The single clip-on strap 30 combines two different spring features. Two identical horizontal cantilever springs 44*a–b* are formed into the straight portions 42a and 42b of the U-shaped clip 30 and point in the direction which the clamp 40 will initially slide. When the two cantilever springs 44*a–b* are compressed as the clamp 40 slides over them, the joining strap 42c connecting the two cantilever springs 44*a–b* are compressed and serves as a leaf spring 43 ready to release its energy by decompression. When decompressed and rigidly locked, the spring biased cantilever beams or contacts 44a and 44b will outwardly spring toward or engage the inside surfaces of the clamp 40 to be described later. Thus, via compression and decompression, the three springs combine in a single wrap-around design to create a positive locking feature of significant strength while loading the clamp 40 to enhance disconnect.

As previously described, the clip 30 has a pair of upturned ledges, lips, or bent up ears 38a and 38b that are inserted into the receiving slots 36a and 36b of the radio housing 12 for clip 30 retainment. Preferably, but not necessarily, there is a pair of inwardly directed vertical cantilever springs 46a and 46b on the arms 42a and 42b cut out from a pair corresponding slots 48a and 48b to help to retain the clip 30 to the radio housing 12.

Figure 4:
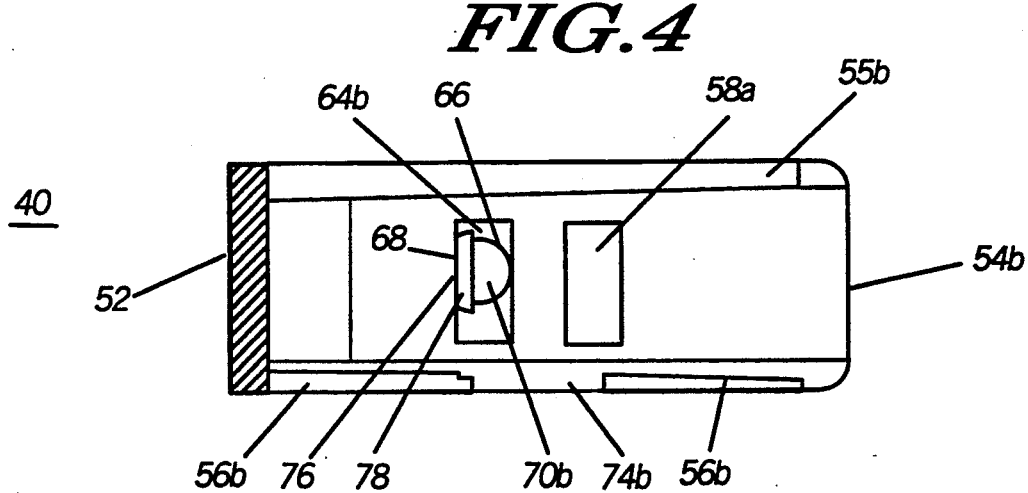
FIG. 4 is a cross-sectional view of the clamps 40 of FIG. 3.

A cross-sectional view taken along lines A—A in FIG. 3 of the sliding clamp 40 is shown in FIG. 4. The sliding clamp or slide 40 is U-shaped and may be formed from cast metal, significantly supported plastic along the direction requiring most support or other suitable rugged material. This rigidity is especially vital during drop and bending or torquing of the radio to ensure a reliable radio-to-battery contact integrity.

Referring to FIGS. 2 and 4, the sliding clamp 40 includes an end 52 and sides 54a and 54b which will slidably clamp both of the housings 12 and 14 together. The end 52 can be constructed of wider dimensions than the sides 54*a–b* to provide more weight at the end 52 to form a backside. The sliding clamp 40 has (preferably tapered) opposed pairs of dovetailed rails 55*a–b* and 56*a–b* which also taper away from each other on each side 54a and 54b. Thus, the dovetail grooves or channels 17*a–b* and 28*a–b* molded in the side walls of the radio and battery housings 12 and 14, respectively, receive the dovetail rails 55*a–b* and 56*a–b* of the sides 54*a–b* of the sliding clamp 40 to have the clamp 40 form an external center portion of the front, back, and side walls of both housings 12 and 14 as seen in FIG. 3. Optionally, the bottom pair of opposed tapered dovetailed rails 56*a–b* are preferably interrupted to enable the battery housing 14 having a corresponding pair of interrupted dovetailed channels 28*a–b* to be removed.

Referring to FIGS. 1-5, to enable the sliding clamp 40 to be permanently attached to the radio housing 12 by the detent feature in the unlocked position, the sliding clamp 40 has a first opposed pair of indentations or recesses 58*a–b* to catch the outwardly bent cantilevers 44a and 44b to retain the slide. In addition, the sliding clamp 40 also includes another pair of opposed indentations or recesses 64 to catch the horizontal cantilever beams 44a and 44b of the clip 30 when the clamp 40 is in the locked or closed position. Within each of the second indentations 64 is a D-shape aperture 66 to form a narrow lip support at the straight edge of the "D" for one of a pair of opposed buttons or manually operable releasing means 70*a–b*. On each side 54*a–b*, the corresponding circular opening 72 on the external side of the clamp 40 is partially blocked off by an inner vertical side wall 68 of the second indentation 64. Thus, the second indentation 64 of the clamp 40 has the D shape opening 66 in back of the full circular opening 72 thereby forming a blocked-off ledge for each of the buttons 70a-b to pivot while captured in the second recesses 64a-b.

Each of the circular buttons 70a-b slant, slope or tilt as referenced to its base and is partially surrounded by an outwardly sloped rim 73. The base or back of the buttons 70a-b each from a "D" having a straight side 76 where the button 70a-b is thickest. At the straight end 76 is a wider and longer diametric cord or ridge 78 which slightly extends beyond the circumference of each of the buttons 70a-b. Each of the buttons 70a-b is inserted through the circular aperture 72 of the clip 40 and rests on the blocked-off ledge and is retained by the wider cord or ridge 78 supported against the sides of the D-shape opening 66 from falling through the large circular opening 72.

In operation, the sliding clamp 40 simultaneously slides over the battery housing 14 and the spring clip 30 which is already attached to the radio housing 12. The U-shaped clip 30, having the two horizontal cantilever beams 44a and 44b, forms a rigid locking device which is spring loaded by a moving body such as the sliding clamp 40 into the leaf spring 43 which naturally results from the bent portion 42c or the "U".

As the sliding clamp 40 is positioned over the radio and battery housings 12 and 14, the lock is initially open with the horizontal cantilever beams 44a-b of the attached clip 30 initially resting in the first pair of opposed recesses 58a-b but starting to be deflected inwardly by the sliding clamp 40. The lock is closed or locked when the clamp 40 has fully slid all the way towards the end of the dovetail channels 17a-b and 28a-b and the cantilever beams 44a-b are free to spring outwardly towards the second pair of opposed indentations 64.

The leaf spring 43 provides additional tension to lock the sliding clamp 40 onto both housings 12 and 14 and thus provides a counter load and also serves to take up tolerances. Since the connecting portion 52 of the clamp 40 may have a backside that is as heavy as desired, it may spring load the leaf spring 43 to provide the counter load.

When the sliding clamp 40 is unlocked, the leaf spring 43 also provides positive feedback. The compressed leaf spring 43 initially counterloaded by the sliding clamp 40 now decompresses to provide positive motion or feedback to complete disconnection. When the two cantilever beams 44a-b lock the sliding clamp 40 in position, the leaf spring 43 is energized as it compresses. Thus, when the beams 44a-b unlock, the leaf spring 43 provides force to unlock the sliding clamp 40.

To provide selective movement of the clamp 40 over both housings 12 and 14 or just over the radio housing 12, the pair of spring-biased release buttons 70a-b selectively apply force against the pair of horizontal cantilever beams 44a-b of the clip 30. When the two horizontal cantilever springs 44a-b are depressed by the pair of pivoting buttons 70a-b, the lock is partially released to allow removal of the battery housing 14 from the radio housing 12 by permitting the sliding clamp 40 to slide with respect to the clip 30 into the open or unlocked position of FIG. 3. Each of the buttons 70a-b, supported only at one side 68, pivots to push each of the cantilever beams 44a-b into a position clear of the side wall of the recesses 64a-b of the clamp 40. Meanwhile, each of the buttons 70a-b, is still retained since the clip 30 and the radio housing 12 on the inner side of each of the buttons 70a-b prevent the buttons 70a-b from being removed.

Figure 5:
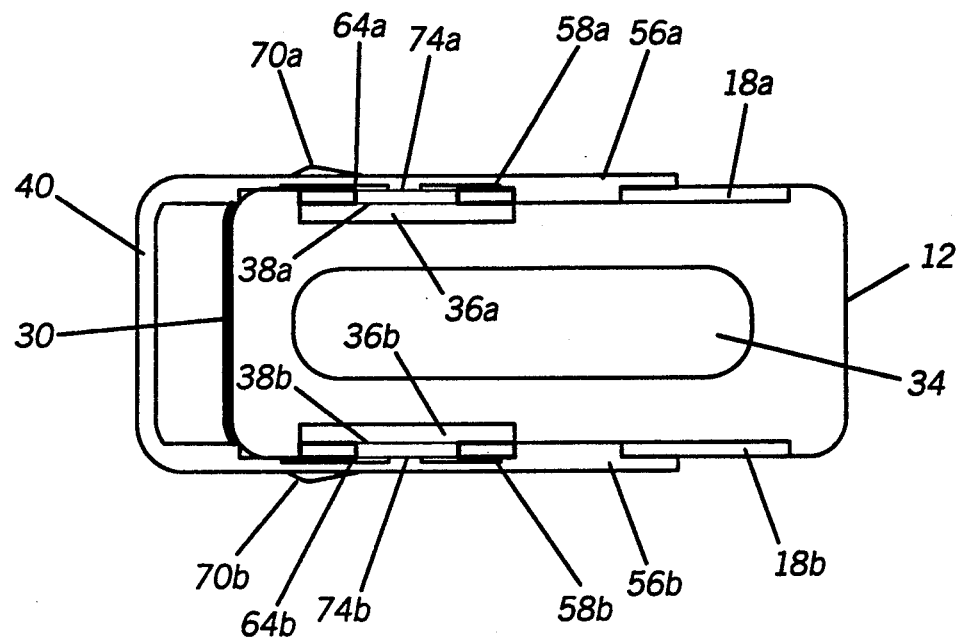
FIG. 5 is a bottom view of the clamp 40 of FIG. 4 partially open and attached to the radio housing of FIG. 3 via the clip 30 of FIG. 1.

Referring to FIG. 5, the sliding clamp 40 cannot be fully released unless the outwardly protruding areas of the cantilever springs 44a-b are flexed inward with a suitable tool (not shown) to clear them from the sidewalls of the indentations 58 of the sliding clamp 40.

In summary, the dovetail channels of the housings and the dovetail rails of the sliding clamp preferably have slanting surfaces or tapered dovetails so that the sliding clamp or slide is more easily locked as it slides over both housings. The tapered dovetail channels provide ramps to force the radio housing into contact with the battery housing as the sliding clamp is moved into its locked position. The well-supported plastic or metal rails thus provide rigid support to provide a continuous mating contact in severe environments and mechanical shock for selective radio/battery connection. Because of the tapering of the dovetail channels and rails, as the sliding clamp is positioned over the radio and battery housings, the lock is initially open, but is closed when the clamp has slid all the way towards the end of the dovetail channel and locked in the closed position. In any applications where positive locking is required and reverse motion results when disconnect occurs, the present invention is useful.

What is claimed is:

1. A portable radio assembly, comprising:
   a radio housing having opposed bottom side portions;
   a battery housing having opposed top side portions;
   a clamp for sliding over said opposed side portions to interconnect said housings; and
   said opposed top side portions of said battery housing having means for retaining said clamp.

2. The portable radio assembly of claim 1 wherein said means for retaining said clamp comprises:
   each of said housings includes rails; and
   said clamp engages said rails for interconnecting said housings.

3. The portable radio assembly of claim 2 wherein said rails of at least one of said housings provide ramps to cause said housings to be pulled together when said clamp interconnects said housings.

4. The portable radio assembly of claim 2 wherein said rails of one of said housings include notches to permit disengagement of said housing and said clamp.

5. The portable radio assembly of claim 2 wherein said clip is in a substantially U-shape configuration having first and second elongated substantially parallel arms and an intermediate resilient portion connecting said arms,
   said arms each having a cantilevered latch.

6. The portable radio assembly of claim 5 wherein said clamp is in a substantially U-shape configuration having first and second elongated substantially parallel arms and an intermediate portion connecting said arms,
   said arms having two pairs of opposed grooves for engaging said rails of said housings,
   said arms having opposed recesses for receiving said cantilevered latches to lock said clamp against said clip, and
   said connecting portion having a backside for spring loading said intermediate resilient portion of said clip.

7. The portable radio assembly of claim 1 wherein said clamp includes manually operable releasing means for permitting movement of said clamp from a locked position.

8. The portable radio assembly of claim 7 wherein said releasing means comprises pivoting buttons and corresponding recesses for capturing said pivoting buttons in said clamp.

9. The portable radio assembly of claim 1 further comprising a spring-loaded clip attached to one of said housings for retaining said clamp in a locked position.

10. The portable radio assembly of claim 8 wherein said clip is attached to said radio housing.

11. The portable radio assembly of claim 1 wherein said battery housing is vertically connected to said radio housing and said clamp fixed to one of said housings horizontally slides over both of said housings to complete a locked connection.

12. A portable radio assembly, comprising:
a radio housing having grooves on a bottom portion of said radio housing;
a battery housing having grooves on a top portion of said battery housing;
a sliding clamp having rails for sliding over said grooves from an unlocked position, wherein said housings are separable, and to a locked position, wherein said housings are interconnected; and
a substantially U-shape spring-loaded clip having first and second elongated substantially parallel arms and an intermediate resilient portion connecting said arms, wherein said clip includes two opposed retaining means on said first and second elongated substantially parallel arms for clipping said clip onto one of said housings for retaining said clamp in said locked position, said intermediate resilient portion and said arms formed into a singular piece which is attached by clipping said clip onto one of said housings.

13. A sliding spring-loaded lock assembly, comprising:
a first housing having a first pair of opposed dovetail grooves;
a second housing having a second pair of opposed dovetail grooves;
a substantially U-shape spring clip having first and second elongated substantially parallel arms and an intermediate portion connecting said arms,
said arms having two pairs of opposed cantilever beams, and
said connecting portion forming a leaf spring; and
a substantially U-shape slide having first and second elongated substantially parallel arms and an intermediate portion connecting said arms,
said arms having two pairs of opposed dovetail rails for engaging both pairs of dovetail grooves of said housings,
said arms having a pair of opposed recesses for receiving said pair of cantilever beams to lock said slide against said clip, and
said connecting portion having a backside for spring loading said leaf spring.

14. The sliding spring-loaded lock assembly of claim 13 wherein at least one of said dovetail grooves and rails is tapered along its length to provide a tighter fit.

15. The sliding spring-loaded lock assembly of claim 13 wherein said clamp includes a pair of releasing means for spring biasing said pair of cantilever beams of said clip against one of said housings to slidably release said clamp sufficiently to remove one of said housings.

16. The sliding spring-loaded lock assembly of claim 13 wherein said at least one opposed pair of dovetail channels and at least one opposed pair of dovetail rails are interrupted to allow vertically demounting of said housings.

17. A battery comprising:
a battery power source; and
a battery housing enclosing said power source;
a projection extending from the top of said battery housing includes a cavity for locating a pair of battery contacts;
a U-shaped recess at the top of three sides of said battery housing below said projection having elongated recessed arms and a connecting recessed side portion;
said U-shape recess includes a pair of opposed dovetailed channels on the lower portion of each arms; and
said dovetailed channels of the battery housing are interrupted by intermediate recesses on opposed sides of said battery housing.

18. The battery of claim 17 wherein said projection includes a recessed rim for receiving an O-ring.

* * * * *